A. T. SMITH.

APPARATUS FOR LIGHTING GAS BY ELECTRICITY.

No. 7,249. Reissued Aug. 1, 1876.

WITNESSES:

Jas. R. Hutchinson

John R. Young

INVENTOR.

A. T. Smith, by

Prindle and Co. his Attys.

THE NORRIS PETERS CO., PHOTO-LITHO., WASHINGTON, D. C.

UNITED STATES PATENT OFFICE.

ADOLPH THEODOR SMITH, OF NEW YORK, N. Y., ASSIGNOR TO ABRAHAM L. BOGART.

IMPROVEMENT IN APPARATUS FOR LIGHTING GAS BY ELECTRICITY.

Specification forming part of Letters Patent No. 146,953, dated January 27, 1874; reissue No. 7,249, dated August 1, 1876; application filed May 19, 1876.

*To all whom it may concern:*

Be it known that I, ADOLPH THEODOR SMITH, of New York city, county and State of New York, did invent certain new and useful Improvements in Apparatus for Lighting Gas by Electricity, for which Letters Patent No. 146,953 were issued to me upon the 27th day of January, 1874, which Letters Patent have been found defective, in that the specification and claims do not cover and embrace all of the original invention, as set forth in the application filed in the Patent Office on the 13th day of December, 1873.

Now, therefore, being desirous of reissuing said Letters Patent herewith surrendered, I have prepared and do hereby declare that the following is a full, clear, and exact description of the said invention, reference being had to the accompanying drawings, making a part of this specification, in which—

Figure 1:
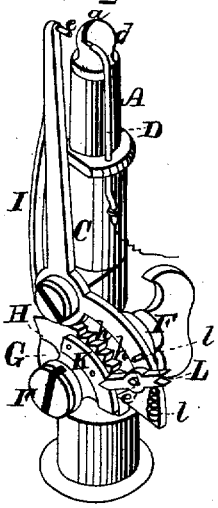
Figure 2:
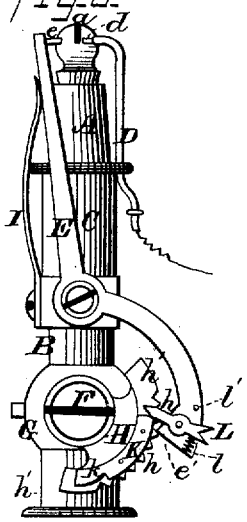
Figure 3:
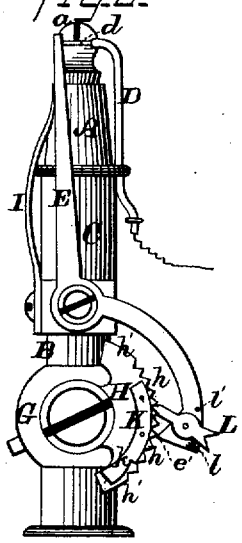
Figure 4:
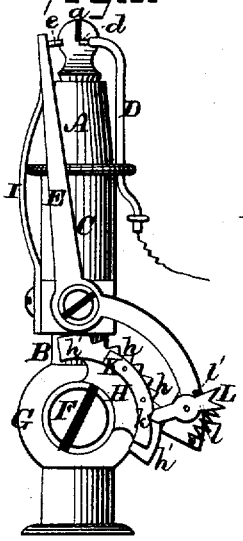
Figure 5:
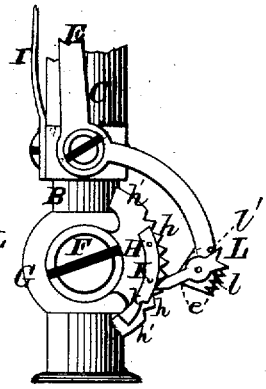

Figure 1 is a perspective view of my improved mechanism in position upon a gas-burner. Fig. 2 is a side elevation of the same, the cock being closed. Fig. 3 is a like view of said mechanism with the cock partially opened. Fig. 4 is a side elevation of the same with the cock entirely opened; and Fig. 5 is a like view of said mechanism with the cock partially closed.

Letters of like name and kind refer to like parts in each of the figures.

The design of my invention is to simplify and render more certain the operation of igniting gas by electricity; and it consists, principally, in gas-lighting apparatus containing a fixed and a pivoted arm, that are insulated from each other, and, by being brought into and removed from contact, close and open an electric circuit and produce an electric spark, the combination of said pivoted arm and the plug of the cock, by mechanism which will cause the former to vibrate upon its pivotal bearing, and to impinge two or more times upon said fixed arm whenever said plug is turned so as to permit the escape of gas, substantially as and for the purpose hereinafter specified.

It consists, further, in the combining with the said mechanism for vibrating said arm, mechanism for insuring an open electric circuit whenever said plug is being turned so as to arrest the flow of gas, substantially as and for the purpose hereinafter shown.

In the annexed drawings, A represents a gas-burner, and B a supply-pipe, which are connected together, and the former insulated by means of a union, C, formed of india-rubber, or other suitable material which is a non-conductor of electricity. To or upon one side of the burner A is secured a metal arm, D, which has a general vertical position, is connected at its lower end with one of the poles of a galvanic battery, and at its upper end curves inward and has its point *d*, preferably tipped with platinum, in close proximity to the orifice *a*, through which gas escapes from said burner. Pivoted upon side of the supply-pipe B is an arm, E, which, above its pivotal bearing, extends upward to a point upon a line with the upper end of the fixed arm D, and is provided with a platinum point, *e*, that extends horizontally inward toward the point *d*, and in exact line with the same, while below said pivotal bearing said arm E extends outward and downward in a curve, and terminates at a point near the vertical center of the plug F of the cock G, which controls the passage of gas from said pipe to the burner. Upon the plug F is secured a segment, H, which is provided with one or more teeth, *h* and *h*, upon its periphery, except at each end, where is a plain portion, *h'*. The lower end of the arm E is provided with a V-shaped projection, *e'*, which is caused to engage with the tooth or teeth *h* and *h* of the segment H by means of a spring, I, that is secured at one end upon the pipe B, and at its opposite end bears against the upper portion of said arm.

As thus arranged, it will be seen that when the plug F is turned so as to permit gas to flow to the burner, the tooth or teeth *h* and *h* of the segment H will impart a vibratory motion to the pivoted arm E, and cause its point *e* to impinge upon the point *d*, when, as said plug is in metallic connection with the second pole of the battery, at each vibration of said arm the electric circuit will be closed and opened, and a spark produced, the number of such sparks corresponding to the number of vibrations.

In order that the vibrating arm E may be thrown out of engagement with the toothed segment H when the plug F is being closed, so as to avoid unnecessary wear of the operative mechanism and waste of the power of the battery, a cam, K, is secured upon the outer face of said segment, and receives the point of a pawl, L, which is pivoted upon the corresponding face of said arm. When the plug F is closed the pawl L bears against the upper end of the cam K, as seen in Fig. 2, and is held in such contact by means of a spring, *l*, that presses against the outer end of said pawl. As the plug is opened the pawl drags over the surface of the cam until said plug is entirely open, when, as seen in Fig. 4, the point of said pawl drops behind a shoulder, *k*, that is formed upon said cam, and when said plug is again closed said pawl assumes the position shown in Fig. 5, its outer end being arrested by a stop, *l'*, so as to cause said pawl to remain at nearly a right angle to the lower portion of the vibrating arm, and by thus holding the latter outward prevent contact between the same and the segment, and also between the points *d* and *e*, and insure an open circuit while closing the cock. When the plug F is entirely closed, the pawl L drops into the position shown in Fig. 2, and the parts are relatively arranged for a repetition of the operation described.

The operation of the mechanism would be precisely the same should the relative positions of tooth or teeth *h* and *h* and V-shaped point *e'* be reversed, by forming said teeth upon the vibrating lever and said point upon the segment H.

The electric circuit is broken at the instant a full head of gas is turned on, and can only be closed by turning off said gas and again opening the cock, the result being perfect security against loss of battery power in consequence of the accidental closure of the circuit.

The means employed for insulating the fixed arm is simple and durable, and is not liable to derangement.

Having thus fully set forth the nature and merits of my invention, what I claim as new is—

1. In a gas-lighting apparatus, containing a fixed and a pivoted arm, which are insulated from each other, and by being brought into and removed from contact, close and open an electric circuit and produce an electric spark, the combination of said pivoted arm and the plug of the cock by mechanism which will cause the former to vibrate upon its pivotal bearing, and to impinge upon said fixed arm whenever said plug is turned so as to permit the escape of gas, said vibrations corresponding in number to that of the teeth operating said arm, substantially as and for the purpose specified.

2. In gas-lighting apparatus, in which the gas is ignited by an electric spark or sparks that are produced by the motion of the plug of the stop-cock while gas is being turned on, the combination, with such mechanism, of a tripping device, which shall maintain an open electric circuit while said plug is being turned to shut off the gas, substantially as and for the purpose shown.

In testimony whereof I hereunto set my hand this 11th day of May, 1876.

ADOLPH THEODOR SMITH.

Witnesses:

A. LIVINGSTON BOGART,
GEO. W. GIBSON, Jr.